United States Patent [19]

Courduvelis et al.

[11] 4,303,704

[45] Dec. 1, 1981

[54] SELECTIVE REMOVAL OF COPPER OR NICKEL FROM COMPLEXING AGENTS IN AQUEOUS SOLUTION

[76] Inventors: Constantine I. Courduvelis, 937 Garden Rd., Orange, Conn. 06477; George C. Gallager, 260 Pearl St., Middletown, Conn. 06457

[21] Appl. No.: 150,924

[22] Filed: May 19, 1980

[51] Int. Cl.$^3$ .............................................. B01J 45/00
[52] U.S. Cl. .................................... 427/345; 210/662; 210/670; 210/688; 210/912
[58] Field of Search .......................... 75/108, 117, 119; 106/1.22, 1.23; 210/662, 670, 688, 702, 724, 912; 423/24, 25, 43, 139–147; 427/345

[56] References Cited

U.S. PATENT DOCUMENTS

| | | | |
|---|---|---|---|
| 2,938,868 | 5/1960 | Carlson et al. | 210/662 |
| 3,666,447 | 5/1972 | Saubestre | 75/108 |
| 3,800,024 | 3/1974 | Forsell et al. | 423/144 |
| 4,076,618 | 2/1978 | Zeblisky | 210/670 |
| 4,080,418 | 3/1978 | Carlberg | 210/688 |
| 4,172,784 | 10/1979 | Knorre et al. | 423/101 |
| 4,172,785 | 10/1979 | Knorre et al. | 210/722 |

OTHER PUBLICATIONS

Rice et al., "Recovery of Nickel and Copper from Ammoniacle Solution by Use of the Experimental Chelating Ion-Exchange Resin Zerolit S-1208", *Inst. of Min. and Met. Trans.*, C86, C153–154, (Sep. 1977).

Amberlite XE-318, Trade Literature of Rohm & Haas Company, Philadelphia, PA.

*Primary Examiner*—Ivars C. Cintins
*Attorney, Agent, or Firm*—DeLio and Montgomery

[57] ABSTRACT

A method is provided for selectively separating and removing complexed heavy metal ions, preferably copper or nickel, from complexing agents in aqueous solution and removing substantially all heavy metal ions while leaving complexing agent in said solution. In preferred embodiments, complexed copper or complexed nickel is selectively removed from aqueous effluent from electroless plating systems by passage through a bed of chelating ion-exchange resin having an iminodiacetic acid functionality. Substantially all copper or nickel will be removed from solution and retained in the resin bed and the complexing agent will pass through for conventional waste treatment or disposal. The copper or nickel is recovered by elution from the resin bed with an acid solution and may, if desired, be precipitated by addition of sodium hydroxide or the like and subsequently separated for recovery or disposal.

An improved process for electroless disposition of copper, or nickel, which facilitates waste treatment or recovery of residual complexed copper or nickel ions from plating or effluent solutions is likewise provided in accordance with the invention.

46 Claims, No Drawings

SELECTIVE REMOVAL OF COPPER OR NICKEL FROM COMPLEXING AGENTS IN AQUEOUS SOLUTION

FIELD OF THE INVENTION

The invention pertains primarily to the art of electroless deposition of heavy metals, particularly copper or nickel, wherein aqueous baths and solutions containing complexed heavy metal ions and complexing agents are utilized. However, the processes of the invention can also be advantageously utilized in various other applications wherein aqueous solutions which contain complexed heavy metal ions and their complexing agents are utilized.

More particularly, the invention provides processes for selectively separating and removing complexed heavy metal ions from their complexing agents in aqueous effluent solutions. This facilitates recovery and/or waste treatment, not only of the complexing agents, but also of the complexed heavy metal ions.

BACKGROUND OF THE INVENTION

Aqueous baths and solutions containing complexed heavy metal ions and complexing agents have been advantageously utilized in the electroless deposition of heavy metals, such as copper and nickel, as well as in metal etchant applications. Complexing agents, such as alkanolamines, ammonia or carboxylic acids and their salts form strong bonds or chelates with heavy metal ions, such as copper or nickel, and are used in electroless deposition baths. However, the strong bonding between the heavy metal ions and complexing agents which are advantageously utilized in such applications, present a problem with regard to recovery and/or waste treatment of such plating solutions and the effluents which emanate from processes employing these solutions.

Typically, waste treatment of plating solutions containing heavy metal ions has employed precipitation of the metals, as hydroxides, mainly by addition of lime. Hydroxide formation, however, is prevented by the presence of complexing agents. In situations where complexing agents were present, various precipitation techniques have been employed, such as use of starch xanthate, ferrous sulfate, cellulose xanthate, hydrogen peroxide, sodium hydrosulfate, sodium borohydride, and the like. However, these prior art techniques at best only provided incomplete removal of complexed heavy metal ions and frequently fail to provide acceptable removal of the heavy metals when applied in the field. Also, these materials are expensive, and they produce sludge, which itself requires disposal and does not facilitate reclamation of pure heavy metals.

Thus, an effective and reliable method for selective removal of complexed heavy metal ions from complexing agents has been lacking in the prior art.

It has been suggested that ion exchange resins could be utilized to remove both complexed heavy metal ions and their complexing agents from electroless copper plating solutions, in order to extend the functional life thereof. U.S. Pat. No. 4,076,618 discloses a process utilizing ion exchange resins, primarily cation-exchange resins containing sulfonic acid functional groups. In this prior art process, an electroless copper solution is continuously passed through a series of cation-exchange resins beds, which retain both the complexed copper and its complexing agent together, with the effluent from the bed being discarded. The complexed copper-complexing agent mixture is then removed from the ion exchange resin. Trace amounts of complexed copper and complexing agent which remain after passage through the cation-exchange resin beds are both removed together, by passage through a bed of chelating resin. The complexed copper and complexing agent mixture which is removed from the chelating resin is either returned for use in the electroless copper bath or recovered for subsequent reuse. However, such treatment does not facilitate waste treatment or recovery of pure heavy metal, since the complexed copper and complexing agent are not separated, but remain strongly chelated.

Thus, the process of U.S. Pat. No. 4,076,618 yields substantial amounts of complexed copper and complexing agent mixture which must be processed further for recovery or waste disposal of copper. In addition, the cation exchange resins used have an extremely low efficiency, due to the presence of large quantities of sodium byproducts in the plating solutions or effluents passed therethrough. This results from the greater affinity of cation exchange resins having sulfonic acid functionality groups for alkali or alkaline earth cations, such as sodium, over transition metals, such as copper or nickel. The only utilization of a chelating ion exchange resin in this prior art process is for passage of very dilute solutions containing complexed copper and complexing agents, with the result being removal of the complexed heavy metal and complexing agent together, without separation.

In accordance with the invention, applicants have unexpectedly discovered that a bed of chelating ion exchange resin having an iminodiacetic acid functionality can be utilized to selectively remove complexed heavy metal ions from complexing agents in aqueous solution. In accordance with the invention, applicants provide a method for removal of complexed heavy metal ions from complexing agents, so as to facilitate not only waste treatment and disposal of effluents containing the same, but also recovery of heavy metal ions and control of maximum concentration levels of heavy metal ions in electroless deposition baths containing the same. Accordingly, waste treatment and disposal techniques which utilize biodegradation can then be utilized, whereas previously such was not possible due to the interference with such treatments caused by the presence of complexed metal ions in the aqueous effluents being treated.

In accordance with the invention, applicants provide a simple and inexpensive method for removing substantially all complexed heavy metal ions from solutions in the presence of complexing agents, whereas prior art chemical precipitation methods fail to provide the requisite degree of removal. Furthermore, the method of the invention is efficient, inexpensive, convenient and yields heavy metal in a more concentrated form of high purity, which facilitates easy reclamation or disposal.

SUMMARY OF THE INVENTION

The process of the invention for selective removal of heavy metal ions from an aqueous solution containing complexed heavy metal ions and complexing agent comprises the steps of providing a bed of chelating ion exchange resin, having an iminodiacetic acid functionality, and passing the aqueous solution containing complexed heavy metal ions and complexing agent through the resin bed, preferably until the capacity of the resin bed to remove the heavy metal ions from solution is substantially depleted. The heavy metal ions are retained in the resin bed, while the effluent passing out of the resin bed contains the complexing agent, but is substantially free of complexed heavy metal ions. The retained heavy metal ions are eluted from the resin by passage of an aqueous acid solution through the bed, whereby the eluate contains uncomplexed heavy metal ions and is substantially free of complexing agents.

In preferred embodiments of the invention, selective removal of copper complexed with alkanolamines, ammonia or carboxylic acids or their salts, or nickel complexed with ammonia or carboxylic acids or their salts, can be accomplished.

The invention also provides a continuous process for maintaining a predetermined maximum concentration of complexed heavy metal ions in an aqueous rinse solution in which complexed heavy metal ions and complexing agents are continuously received or built up. This is accomplished by selective removal of complexed heavy metal ions by passage of a portion of the aqueous bath through a chelating ion exchange resin bed, with retention in the effluent from the bed of substantially all of the complexing agent, which is recycled to the bath.

A further embodiment of the invention provides an improved process for electroless deposition of copper, which facilitates waste treatment or recovery of complexed copper ions from electroless copper plating or rinse solutions, or effluents from processes in which they are employed. A workpiece is contacted with an electroless copper plating bath which contains complexed copper ions and complexing agent, and is subsequently contacted with one or more aqueous rinse solutions in which complexed copper ions and complexing agents accumulate. The improvement in the process provided in accordance with the invention comprises provision of a bed of chelating ion-exchange resin having an iminodiacetic acid functionality, passing aqueous solutions containing the complexed copper ions and complexing agent through the resin bed, preferably until its capacity to remove copper ions from solution is depleted. The copper ions are retained in the resin bed, while the effluent passing out of the bed contains the complexing agent, but is substantially free of complexed copper ions. The resin bed is then eluted with an aqueous acid solution, with the eluate containing uncomplexed copper ions and being substantially free of complexing agent.

Likewise, yet a further embodiment of the invention provides an analogously improved process for electroless deposition of nickel, which facilitates waste treatment or recovery of complexed nickel ions from electroless nickel plating or rinse solutions or their effluents from processes in which they are employed.

It is an object of the invention to provide a method for selectively separating and removing complexed heavy metal ions, preferably copper or nickel, from complexing agents in aqueous solutions, so as to substantially remove all of the heavy metal ions, while leaving almost all of complexing agent in solution.

It is also an object of the invention to provide a process for the continuous maintenance of a predetermined maximum concentration of complexed heavy metal ions in an aqueous rinse solution in which the concentrations of such heavy metal ions and complexing agent continuously build up.

It is a further object of the invention to provide improved processes for electroless deposition of heavy metals, particularly copper or nickel, which facilitate recovery or waste treatment of such complexed heavy metal ions in a manner which is both inexpensive and suitably reliable for compliance with environmental regulations.

Other objects and advantages of the various embodiments of the process of the invention will be readily apparent to those skilled in the art through study of the following description of the preferred embodiments and the appended claims.

DETAILED DESCRIPTION OF THE PREFERRED EMBODIMENTS

As will be evident from the various preferred embodiments of the invention to be described herein, it has been discovered that chelating ion-exchange resins having an iminodiacetic acid functionality can be utilized to separate and remove complexed heavy metal ions from the agents used to form complexes with them. These specialized ion-exchange resins are highly specific to heavy metal cations, most notably for purposes of the invention to copper and nickel. In contrast, the cation exchange resins utilized in the prior art have an inherent preference for the common alkali or alkaline earth cations, most notably sodium, over the heavy metal ions or complexing agents. Thus, while the efficiency of the cation exchange resins is typically very low with conventional plating solutions, which contain high levels of sodium, the chelating resins employed in accordance with the invention are extremely efficient.

In accordance with the invention, it has been unexpectedly discovered that the iminodiacetic acid functionality of such chelating resins, which possesses a moderate chelating formation constant ($K=10.55$), will completely remove copper from NNN'N'-tetrakis-(2-hydroxypropyl) ethylenediamine ($K=9.2$) or tartaric acid ($K=9.9$). Typically, removal of the metal from complexing agents having such close K values would not be expected.

It has also been unexpectedly discovered that a chelating ion-exchange resin of the type utilized in accordance with the invention will take nickel away from its complex with ammonium in a neutral or alkaline solution (i.e. pH of 7.0 or higher), while it will remove copper from its complex with ammonia from a solution at any pH above about 2.2.

The preferred chelating ion-exchange resin utilized in accordance with the invention is commercially available under the trade name "Amberlite IRC-718" from Rohm & Haas Company, Philadelphia, Pennsylvania, U.S.A. This resin contains an iminodiacetic acid functionality and is preferably eluted with a strong acid solution and after rinsing the physically retained acid, the resin is ready to be used for another cycle. It may be converted to its salt form with sodium or potassium bases, but this is not necessary and, in accordance with the invention, is less preferred.

It is fully within the purview of the invention that equivalent chelating ion-exchange resins, having the iminodiacetic acid functionality, can be utilized. For example, Zerolit S-1208, commercially available from Zerolit Ltd. of London, England, and Chelex 100 available from BIO-RAD Laboratories of Richmond, California, U.S.A. and comprising a styrene divinylbenzene copolymer containing iminodiacetate functional groups, can likewise be utilized.

Preferred embodiments of the invention provide for selective removal of heavy metal ions which preferably are either copper or nickel, as utilized in solutions for electroless deposition, metal etching or related processes.

When copper is utilized, the preferred complexing agents are alkanolamines, particularly NNN'N'-tetrakis-(2-hydroxypropyl) ethylenediamine, triethanolamine, tri-isopropanolamine or diethylenetriamine penta-substituted with one or more substituents selected from hydroxyethyl or hydroxypropyl or combinations thereof, ammonia or carboxylic acids or their salts. Preferred carboxylic acid is tartaric acid, with the carboxylic acid salt preferably being sodium potassium tartrate.

In embodiments directed to selective removal of complexed nickel, the preferred complexing agents are ammonia or carboxylic acids or their salts, which preferably are either citric, malic, succinic, or lactic acid or their salts.

In accordance with one preferred embodiment, a bed of chelating ion-exchange resin having an iminodiacetic acid functionality, preferably Amberlite IRC 718 resin, is utilized. The aqueous solution from which the complexed heavy metal ions are to be selectively removed is passed through the resin bed. While it is fully within the purview of the invention that passage through the resin bed may be continued or maintained for any period of time, as long as the resin bed maintains its capacity to remove heavy metal ions from solution, it is preferable to continue passage through the resin bed until the capacity thereof to remove heavy metal ions from solution is substantially depleted. Depletion of the resin bed capacity may be determined by detection of the presence of complexed heavy metal ions in the effluent passing from the resin bed, or in any other conventional manner.

The effluent passing from the resin bed contains the complexing agent, but is substantially free of complexed heavy metal ions. For purposes of the invention, it is to be understood that it is acceptable to have trace amounts of complexed heavy metal ions present in the effluent, provided that such does not adversely affect or interfere with subsequent recovery or waste disposal of the complexing agent.

In order to regenerate the resin bed, which may be done when its capacity to remove heavy metal ions from solution is either partially or fully depleted, it is eluted by passage therethrough of an aqueous acid solution, preferably a strong acid solution having a pH approaching zero. Preferably, a 0.5 to 20% solution of sulfuric or other strong acid is used as the eluent. The eluate passing from the resin bed is not allowed to mix with the previously collected effluent, but is collected or treated separately, since it contains uncomplexed heavy metal ions, free from the complexing agent with which it was previously complexed.

For purposes of the invention, it is to be understood that trace amounts of complexing agent may be present in the eluate, provided that it is not present in an amount sufficient to adversely affect or interfere with subsequent recovery or waste disposal of the heavy metal ions.

A further, optional step in accordance with the invention involves effecting preciptiation of the uncomplexed heavy metal ions from the eluate solution. For example, addition of an alkali hydroxide, such as sodium or potassium hydroxide, will precipitate the heavy metal ions.

The precipitate can then be removed from the eluate by conventional techniques, for example by filtration or centrifuging, followed by decanting of the supernatant eluate solution.

Following elution, the chelating resin bed can, if desired, be returned to its sodium form by passage therethrough of a caustic solution, such as an aqueous solution of sodium hydroxide or the like. However, it is preferred to omit this step and proceed with reuse of the regenerated resin in its acid form, which is believed to extend the life of the resin.

After regeneration, additional quantities of aqueous solution containing complexed heavy metal ions and complexing agents may be passed through the regenerated resin bed.

In accordance with another embodiment of the invention, a predetermined maximum concentration of complexed heavy metal ions in an aqueous bath or solution, such as a rinse, which contains complexed heavy metal ions together with complexing agent can be maintained. A continuous process is employed, comprising removal of a portion of the bath or solution, treatment with a chelating resin in accordance with the invention and recycling of the resin bed effluent. The amount and rate at which such solution is passed through the bed of chelating ion-exchange in accordance with the invention is determined by selection of a rate substantially the same as the rate at which complexed heavy metal ions enter, or build up in, the bath or rinse being treated.

The heavy metal ions are retained in the resin bed, and effluent flowing from the chelating resin bed is recycled, preferably until the capacity of the resin bed to remove heavy metal ions from solution becomes substantially depleted. When it is appropriate, or necessary such as upon depletion, to regenerate the resin bed, the appropriate portion of the aqueous solution is preferably directed to a backup resin bed or beds, and the resin to be regenerated is taken off-stream.

The partially, or fully, exhausted resin bed is eluted with aqueous acid solution. The eluate contains uncomplexed heavy metal ions and is substantially free of complexing agent. The heavy metal ions in the eluate can be recovered or disposed of, as may be desired. The eluted resin bed is preferably left in its acid form, but may, if desired, be returned to its sodium form in the manner previously disclosed, and then placed back on-stream, when the current "on-line" resin is regenerated.

In yet another embodiment of the invention, an improved process for electroless deposition of copper is provided which facilitates waste treatment or recovery of complexed copper ions from plating or rinse solutions or their effluents. Conventional electroless copper deposition baths and solutions are utilized, with the workpiece being contacted with a copper plating bath containing complexed copper ions and complexing agent. It is fully within the purview of the invention that any conventional electroless copper plating solutions which contain complexed copper ions and complexing agent, preferably NNN'N'-tetrakis-(2-hydroxypropyl) ethylenediamine, triethanaolamine, or tri-isopropanolamine or diethylenetriamine penta-substituted with one or more substitutents selected from hydroxyethyl or hydroxypropyl, can be utilized.

Subsequent to contacting the workpiece with the copper plating bath, it may be contacted with one or more aqueous rinse solutions or other treatment solutions, in which complexed copper ions and the complexing agent accumulate. These aqueous baths or solutions are passed through a bed of chelating ion-exchange resin having an iminodiacetic acid functionality, preferably until the capacity of the resin bed to remove copper ions from solution is substantially depleted. The copper ions are retained in the resin bed, while effluent passing from the resin bed contains complexing agent and is substantially free of complexed copper ions. Elution of the resin bed yields an eluate which contains uncomplexed copper ions and is substantially free of complexing agent. The resin bed is either left in its acid form, or if desired may be returned to its sodium form, and reutilized.

In yet a further embodiment of the invention, an improved process for electroless deposition of nickel is provided which likewise facilitates recovery or waste treatment of the complexed nickel ions contained in plating or rinse solutions to their effluents. As with the aforementioned embodiment directed to electroless deposition of copper, the workpiece is contacted with a conventional electroless nickel plating bath, containing complexed nickel ions together with complexing agents. Subsequently it is contacted with one or more rinse or treatment solutions, in which said complexed nickel ions and complexing agent accumulate.

As with previously described embodiments, the aqueous solution to be treated is passed through a bed of chelating ion exchange resin having an iminodiacetic acid functionality, preferably until the capacity of the resin bed to remove nickel ions from solution is substantially depleted. The nickel ions are retained in the resin bed, and effluent passing from the resin bed contains complexing agent for the nickel, but is substantially free of complexed nickel ions. The resin bed is then eluted, with the eluate containing uncomplexed nickel ions and being substantially free of the complexing agent. The eluted resin bed is either left in its acid form, or if desired may be returned to its sodium form, and reutilized.

The following examples are illustrative of, but do not limit, the scope and application of the invention.

EXAMPLES

EXAMPLE 1

A solution of spent electroless copper plating bath, containing 11.1 g/l copper sulfate pentahydrate (CuSO4.5H2O), 25 g/l NNN'N'-tetrakis-(2-hydroxypropyl) ethylenediamine complexing agent, 8 g/l sodium hydroxide, 14 ml/l of formaldhyde (37% solution) and 60 g/l each of sodium sulfate and sodium formate, was treated in accordance with the preferred method of the invention for selective removal of copper from the NNN'N'-tetrakis-(2-hydroxylpropyl) ethylenediamine complexing agent. The pH of the spent electroless plating solution was adjusted to about 2.5 by addition of 18 ml of sulfuric acid per liter of spent bath.

A glass column, 4 cm in diameter, was charged with 292 grams of Amberlite IRC-718 wet resin to a height of 30 cm. The acidified spent plating solution was passed through the resin at a rate of 12 ml/min. The effluent was collected in the following fractions which contained 8.3 to 15.6 g/l of the complexing agent, as follows:

| Total Volume of Effluent Passed (ml) | pH of Effluent | Atomic Absorption Analysis (Cu°, ppm) |
|---|---|---|
| 600 | 1.0 | Less than 1 |
| 1200 | 1.7 | Less than 1 |
| 2200 | 2.0 | Less than 1 |
| 3000 | 1.8 | 3.4 |

The column was then rinsed with water and eluted with 4% by volume of sulfuric acid, which has passed through the column at a rate of 12 ml/min. The eluate was analyzed with the following results:

| | Analysis of Eluate | | |
|---|---|---|---|
| Fraction | Volume of Eluate Collected (ml) | Copper Content (CuSO4.5H2O) | Total CuSO4.5H2O |
| 1 | 550 (discarded) | Less than 1 ppm | |
| 2 | 100 | 32.2 g/l | 3.2 g |
| 3 | 100 | 85.8 g/l | 8.6 g |
| 4 | 100 | 125.0 g/l | 12.5 g |
| 5 | 100 | 91.0 g/l | 9.1 g |
| 6 | 100 | 2.1 g/l | 0.2 g |

Total CuSO4.5H2O 33.6 grams
Total CuSO4.5H2O passed 33.3 grams

The pH of each of the eluate fractions was adjusted to between 9 to 10 by addition of sodium hydroxide. After overnight settling, the fractions were filtered and the filtrates were analyzed for copper. The copper hydroxide collected from the filtrates was very pure and could be converted to sulfate, nitrate or chloride salts. The copper sulfate reclaimed was found to be suitable for formation of additional electroless copper plating solutions.

Fractions No. 4–6 contained less than 1 ppm of copper, while Fraction No. 2–3 contained a total of 9 ppm of elemental copper in 200 ml of filtrate. Thus, first 200 ml of filtrate required further passage through the resin in a subsequent cycle for substantially complete removal of copper.

EXAMPLE 2

In accordance with the embodiment of the invention directed towards a continuous process for maintaining a predetermined maximum concentration of complexed heavy metal ions in an aqueous bath, Example 1 was repeated with the following modifications. A total of 6 liters of simulated rinse water, contaminated with complexed copper and complexing agent, was prepared by continuously adding 0.36 ml/min. of electroless copper solution, which contained 2,375 ppm of complexed copper. This simulates approximately a 1:1000 scale-down of operating conditions in an existing plating-on-plastics installation.

Selecting 43 ppm of complexed copper as the maximum concentration of copper to be permitted in the simulated rinse, a rate of recirculation of 20 ml/min. was calculated, in accordance with the following:

Since V, the volume of rinse passing through the column per minute, would yield all of its complexed copper ions during passage, then, $$V = \frac{(0.36) \times (2,375)}{43}$$

$$V = 19.88 \text{ ml/min.}$$

Accordingly, 20 ml/min. of the simulated rinse solution was passed through the resin bed, as in Example 1, and the system operated continuously for 6 full twentyfour hour days, with the pH of the rinse being maintained between 2.5–5.0. During this time, the simulated rinse was analyzed by atomic absorption analysis and found to contain between 25–35 ppm of copper. The effluent from the resin bed contained less than 1 ppm of copper and was returned to the simulated rinse solution. The experiment was continued for a 7th day, whereupon the copper level in the rinse rose to a final concentration of 52 ppm, with the resin bed effluent being returned to the simulated rinse containing 5 ppm of copper. At this point, had the experiment been continued, it would have been necessary to place a backup resin bed on line, and elute and regenerate the resin bed initially utilized.

EXAMPLE 3

Example 2 was repeated, except that a column 25 cm in diameter by 180 cm in height was packed with 0.092 cubic meters of Amberlite IRC 718 resin. This approximated a scale-up of Example 2 to 275:1.

The volume of simulated rinse water and flow rates were likewise scaled up to approximately 275:1. Over four days of continuous operation, the level of copper in the rinse water was maintained at between about 25–35 ppm, with the effluent leaving the resin bed and being returned to the simulated rinse containing less than 1 ppm of copper.

EXAMPLE 4

Another scale-down of an existing production installation was repeated, in accordance with the method set forth in Example 2. However, the simulated rinse solution was contaminated with an electroless copper plating solution having the following composition:

Sodium potassium tartrate: 20 g/l
Copper sulfate: 21 g/l
Formaldehyde (37% solution): 50 ml/l
Free sodium hydroxide: 12 g/l
pH maintained between 3.0–5.0

The resin bed utilized was packed in a column 4 cm in diameter, loaded to a height of 10 cm.

A 600 ml portion of simulated rinse water was provided to receive 3.9 ml of the above electroless copper solution every hour over four continuous 24-hour days of operation. The rate of recirculation was 16 ml/min.

For the first 58 hours of operation, the level of complexed copper in the rinse was approximately 26 ppm. By the 82nd hour of operation, the level had increased to 55 ppm.

The effluent flowing from the resin bed and returning to the simulated rinse solution contained less than 1 ppm of copper during the first 38 hours of operation. This level rose to 16 ppm after 58 hours of operation. Elution of the copper from the resin bed and subsequent regeneration thereof was accomplished as in the previous examples.

EXAMPLE 5

A column containing Amberlite IRC-718 resin, as described in Example 1, was utilized for selective removal of copper from ammoniacal etch rinse water, which contained 13.4 g/l copper sulfate pentahydrate fully complexed with ammonia at pH=11.5. The rinse water was acidified to pH 4.0 and passed through the resin bed. The eluate fractions passing from the resin bed had the following content:

| Fraction | Volume (ml) | Cu ppm |
| --- | --- | --- |
| 1 | 710 | 1.0 |
| 2 | 350 | 1.6 |
| 3 | 390 | 2.5 |
| 4 | 720 | 4.4 |
| 5 | 130 | 5.6 |

A total of 2,388 ml of the rinse solution, containing a total of 32 g of copper sulfate pentahydrate was passed through the column.

The column was eluted using a 4% by volume sulfuric acid solution yielding the following:

| Fraction | Volume (ml) | Copper Metal |
| --- | --- | --- |
| 1 | 285 | 0.9 gr/l |
| 2 | 230 | 10.0 gr/l |
| 3 | 195 | 23.9 gr/l |
| 4 | 110 | 11.5 gr/l |
| 5 | 205 | 53.0 ppm |
| 6 | 345 | 18.0 ppm |
| 7 | 315 | 14.0 ppm |
| 8 | 330 | 1.5 ppm |

Fractions 1–4 were combined and the pH adjusted to between 10–11, with sodium hydroxide. Copper hydroxide was precipitated, filtered, washed and dissolved in sulfuric acid and analyzed to contain 30.3 grams of copper sulfate pentahydrate. The supernatant solutions remaining from fractions 1–4 totalled 820 ml and contained 1.7 ppm of copper metal.

EXAMPLE 6

Example 5 was repeated, except that the rinse water was passed through the column at pH=11.0. The ammoniacal etch rinse used in this experiment contained 12.9 g/l of copper sulfate pentahydrate. A total of 3000 ml of the solution was passed through the resin bed in the column with the following fractions collected:

| Fraction | Volume (ml) | Cu (ppm) |
| --- | --- | --- |
| 1 | 240 | less than 1 |
| 2 | 333 | less than 1 |
| 3 | 380 | 1 |
| 4 | 355 | 1.6 |
| 5 | 380 | 2.1 |
| 6 | 390 | 3.1 |
| 77 | 405 | 4.9 |
| Rinsed with deionized water collected fractions: | | |
| 8 | 385 | 7.0 |
| 9 | 330 | less than 1 |
| 10 | 114 | less than 1 |

All of the fractions collected yielded an ammonia odor in alkaline pH, indicating that substantial amounts of the complexing agent had passed through the resin bed. The column was rinsed with an additional 6 liters of water, with the effluent passing from the bed continuing to yield an ammonia odor and giving a basic reaction on pH test paper.

The column was eluted with a 4% by volume solution of sulfuric acid to yield copper solutions from which copper was quantitatively precipitated with sodium hydroxide at pH 12. The filtrate was colorless, indicating the absence of more than 5–6 ppm of copper, and had a faint ammoniacal odor, indicating the presence of only residual amount of ammonia.

EXAMPLE 7

An electroless nickel solution, containing 9 g/l of nickel, 100 g/l of sodium citrate, 50 g/l of ammonium chloride, 10 g/l of sodium hypophosphite, at pH 8.3, was passed through the resin column identical to that utilized in Example 1. The rate of passage through the resin bed was 14 ml/min. The initial 600 ml fraction of effluent passing from the bed contained less than 1 ppm of nickel (with 5.4 grams of nickel having been retained in the resin bed). The next fraction of 200 ml contained 3 ppm of nickel, while the third fraction of 250 ml contained 46 ppm of nickel. The column was rinsed with water and eluted using a 4% by volume solution of sulfuric acid. The initial 245 ml of eluate contained about 20 ppm of nickel, with the following fractions which totalled 800 ml, containing the bulk of nickel, each of which varied from 4 to 26 g/l. The final eluate fraction of about 500 ml contained only a few ppm of nickel. The eluate fractions were combined and treated with sodium hydroxide, with nickel being quantitatively precipitated, with the filtrate containing only 0.4 ppm of nickel.

EXAMPLE 8

Example 1 was repeated, except that the electroless copper solution contained 10.5 g/l copper sulfate pentahydrate, which was passed through the resin bed at a pH of 11.0, in order to illustrate the operability of the invention with alkaline solutions.

After two liters of solution was passed through the resin bed, the effluent flowing from the column showed the characteristic blue color of copper sulfate.

The column was rinsed with water until the effluent flowing from the bed turned colorless. This required approximately 7.5 liters of rinse at a high flow rate. Although the effluent flowing from the resin bed was acidic until rinsing was begun, it was basic upon completion of the rinse.

Elution of the resin bed was accomplished using a 4% by volume solution of sulfuric acid. The eluate was treated with sodium hydroxide to precipitate 97.5% of the copper, leaving the remaining 2.5% chelated with NNN'N'-tetrakis-(2-hydroxypropyl) ethylenediamine.

As will be readily apparent to one skilled in the art, various modifications can be made in the details of the invention and the various embodiments of the method and process thereof to provide for selective removal of complexed heavy metal ions from their complexing agents in aqueous solution. For example, above a minimum pH of about 2.2 for removal of copper and about 7.0 for removal of nickel for aqueous solutions, it should be readily apparent that pH is not otherwise a critical factor, except to the extent to which utilization of the particular bed of resin having iminodiacetic acid functionalities can be maximized or utilized in accordance with the particular process or environmental considerations of any given application.

What is claimed is:

1. A process for selective removal of heavy metal ions from an aqueous solution containing complexed heavy metal ions and a complexing agent selected from the group consisting of alkanolamines or carboxylic acids or salts thereof, with said complexing agent remaining in said solution, comprising the steps of:
   (a) providing a bed of chelating ion-exchange resin having an iminodiacetic acid functionality,
   (b) passing said aqueous solution through said resin bed, whereby heavy metal ions are removed from said aqueous solution and retained in said resin bed and the effluent passing out of said resin bed contains said complexing agent, but is substantially free of complexed heavy metal ions, and
   (c) eluting said retained heavy metal ions from said resin bed by passage therethrough of an aqueous acid solution, whereby the eluate contains heavy metal ions and is substantially free of said complexing agent, and whereby said resin bed is regenerated for reuse.

2. The process of claim 1, wherein said heavy metal ions are ions of copper and the pH of said aqueous solution is at least about 2.2.

3. The process of claim 1, wherein said alkanolamines are selected from the group consisting of NNN'N'-tetrakis-(2-hydroxypropyl) ethylenediamine, tri-ethanolamine, triisopropanolamine or diethylenetriamine penta-substituted with one or more substituents selected from hydroxyethyl, hydroxypropyl or combinations thereof.

4. The process of claim 1, wherein said carboxylic acid is tartaric acid and said carboxylic acid salt is sodium potassium tartrate.

5. The process of claim 1, wherein said heavy metal ions are ions of nickel, the pH of said aqueous solution is at least about 7.0 and said complexing agent is carboxylic acids or salts thereof.

6. The process of claim 5, wherein said carboxylic acid is selected from citric, malic, succinic or lactic acid or salts thereof.

7. The process of claim 1, wherein said aqueous solution is passed through said resin bed until the capacity of said resin bed to remove said heavy metal ions from said aqueous solution is substantially depleted.

8. The process of claim 7 wherein depletion of said capacity of said resin bed to remove said heavy metal ions from said aqueous solution is determined by detection of complexed heavy metal ions in said effluent passing out of said resin bed.

9. The process of claim 1, further including the step of effecting precipitation of said heavy metal ions in said eluate and removal of said precipitated heavy metal therefrom.

10. The process of claim 9, wherein said heavy metal ion is precipitated by addition of an alkali hydroxide.

11. The process of claim 9, wherein said precipitated heavy metal is removed from said eluate by filtration.

12. The process of claim 1, wherein said regenerated resin is used in its acid form.

13. The process of claim 1, further including the step of converting the eluted resin bed to its sodium form by passage therethrough of a caustic solution.

14. A continuous process for maintaining a predetermined maximum concentration of complexed heavy metal ions in an aqueous rinse solution bath containing complexed heavy metal ions and complexing agent selected from the group consisting of alkanolamines or carboxylic acids or salts thereof by selective removal of said heavy metal ions, with said complexing agent remaining in solution, comprising the steps of:
   (a) providing a bed of chelating ion-exchange resin having an iminodiacetic acid functionality,
   (b) passing a portion of said aqueous solution from said bath containing complexed heavy metal ions and complexing agent through said resin bed at a rate substantially no less than the rate at which complexed heavy metal ions enter said bath, said resin bed containing sufficient resin to selectively remove and retain substantially all of said heavy metal ions from said aqueous solution passed therethrough, with substantially all of said complexing agent remaining in the effluent passing out of said resin bed, (c) recycling said effluent from said resin bed to said bath, and (d) eluting said retained heavy metal ions from said resin bed by passage therethrough of an aqueous acid solution, whereby the eluate contains heavy metal ions and is substantially free of said complexing agent, and whereby said resin bed is regenerated for reuse.

15. The continuous process of claim 14, wherein said regenerated resin is used in its acid form.

16. The continuous process of claim 14, further including the step of returning the eluted resin bed to its sodium form by passage therethrough of a caustic solution.

17. The continuous process of claim 14, wherein said heavy metal ions are ions of copper and the pH of said rinse solution is at least about 2.2.

18. The continuous process of claim 17, wherein said carboxylic acid is tartaric acid and said carboxylic acid salt is sodium potassium tartrate.

19. The continuous process of claim 14, wherein said alkanolamines are selected from the group consisting of NNN'N'-tetrakis-(2-hydroxypropyl) ethylenediamine, triethanolamine, tri-isopropanolamine or diethylenetriamine penta-substituted with one or more substituents selected from hydroxyethyl, hydroxypropyl or combinations thereof.

20. The continuous process of claim 14, wherein said heavy metal ions are ions of nickel, the pH of said rinse solution is at least about 7.0 and said complexing agent is carboxylic acids or salts thereof.

21. The continuous process of claim 20, wherein said carboxylic acid is selected from citric, malic, succinic or lactic acid or salts thereof.

22. The continuous process of claim 14, wherein passage of said aqueous solution through said resin bed is continued until the capacity of said resin bed to remove said heavy metal ions from said aqueous solution is substantially depleted.

23. The continuous process of claim 22, wherein depletion of said capacity of said resin bed to remove said heavy metal ions from said aqueous solution is determined by detection of complexed heavy metal ions in said effluent passing out of said resin bed.

24. The continuous process of claim 14, further including the step of effecting precipitation of said heavy metal ions in said eluate and removal of said precipitated heavy metal therefrom.

25. The continuous process of claim 24, wherein said precipitated heavy metal is removed from said eluate by filtration.

26. In an improved process for electroless deposition of copper which facilitates waste treatment or recovery of complexed copper ions from plating or rinse solutions or effluents thereof, wherein a workpiece is contacted with a copper plating bath, containing complexed copper ions and complexing agent selected from the group consisting of alkanolamines or carboxylic acids or salts thereof, and subsequently contacted with one or more aqueous rinse solutions in which said complexed copper ions and said complexing agent accumulate, the improvement which comprises the steps of:

(a) providing a bed of chelating ion-exchange resin having an iminodiacetic acid functionality, (b) passing the aqueous solution containing said complexed copper ions and said complexing agent through said resin bed, whereby copper ions are removed from said aqueous solution and retained in said resin bed and the effluent passing out of said resin bed contains said complexing agent, but is substantially free of complexed copper ions, and (c) eluting said retained copper ions from said resin bed by passage therethrough of an aqueous acid solution, whereby the eluate contains copper ions and is substantially free of said complexing agent, and whereby said resin bed is regenerated for reuse.

27. The improved process of claim 26 wherein the pH of said rinse solution is at least about 2.2.

28. The process of claim 26, wherein alkanolamines are selected from the group consisting of NNN'N'-tetrakis(2-hydroxypropyl) ehtylenediamine, tri-ethanolamine, tri-isopropanolamine or diethylenetriamine penta-substituted with one or more substituents selected from hydroxyethyl, hydroxypropyl or combinations thereof.

29. The improved process of claim 26 wherein carboxylic acid is tartaric acid and said carboxylic acid salt is sodium potassium tartrate.

30. The improved process of claim 26, wherein said aqueous solution is passed through said resin bed until the capacity of said resin bed to remove copper ions from said aqueous solution is substantially depleted.

31. The improved process of claim 30 wherein depletion of said capacity of said resin bed to remove said copper ions from said aqueous solution is determined by detection of complexed copper ions in said effluent passing out of said resin bed.

32. The improved process of claim 26, further including the step of effecting precipitation of said copper ions in said eluate and removal of the precipitated copper compound therefrom.

33. The improved process of claim 32, wherein said copper ion is precipitated by addition of alkali hydroxide.

34. The improved process of claim 32 wherein said precipitated copper compound is removed from said eluate by filtration.

35. The improved process of claim 26, wherein said regenerated resin is used in its acid form.

36. The improved process of claim 26 further including the step of converting the eluted resin bed to its sodium form by passage therethrough of a caustic solution.

37. In an improved process for electroless deposition of nickel which facilitates waste treatment or recovery of complexed nickel ions from plating or rinse solutions or effluents thereof, wherein a workpiece is contacted with a nickel plating bath, containing complexed nickel ions and complexing agent selected from the group consisting of alkanolamines or carboxylic acids or salts thereof, and subsequently contacted with one or more aqueous rinse solutions in which said complexed nickel ions and said complexing agent accumulate, the improvement which comprises the steps of:

(a) providing a bed of chelating ion-exchange resin having an iminodiacetic acid functionality, (b) passing the aqueous solution containing said complexed nickel ions and said complexing agent through said resin bed, whereby nickel ions are removed from said aqueous solution and retained in said resin bed and the effluent passing out of said resin bed contains said complexing agent, but is substantially free of complexed nickel ions, and (c) eluting said retained nickel ions from said resin bed by passage therethrough of an aqueous acid solution, whereby the eluate contains nickel ions and is substantially free of said complexing agent, and whereby said resin bed is regenerated for reuse.

38. The improved process of claim 37 wherein the pH of said rinse solution is at least about 7.0 and said complexing agent is carboxylic acids or salts thereof.

39. The improved process of claim 37 wherein carboxylic acid is selected from citric, malic, succinic or lactic acid or salts thereof.

40. The improved process of claim 37 wherein said aqueous solution is passed through said resin bed until the capacity of said resin bed to remove nickel ions from said aqueous solution is substantially depleted.

41. The improved process of claim 40 wherein depletion of said capacity of said resin bed to remove said nickel ions from said aqueous solution is determined by detection of complexed nickel ions in said effluent passing out of said resin bed.

42. The improved process of claim 37 further including the step of effecting precipitation of said nickel ions in said eluate and removal of the precipitated nickel compound therefrom.

43. The improved process of claim 42 wherein said nickel ion is precipitated by addition of alkali hydroxide.

44. The improved process of claim 42 wherein said precipitated nickel compound is removed from said eluate by filtration.

45. The improved process of claim 37 wherein said regenerated resin is used in its acid form.

46. The improved process of claim 37 further including the step of converting the eluted resin bed to its sodium form by passage therethrough of a caustic solution.

* * * * *

UNITED STATES PATENT AND TRADEMARK OFFICE
CERTIFICATE OF CORRECTION

PATENT NO. : 4,303,704
DATED : December 1, 1981
INVENTOR(S) : Costa I. Courduvelis, et al It is certified that error appears in the above-identified patent and that said Letters Patent are hereby corrected as shown below:

Column 10, line 18
Delete in the table under Fraction (Col. 1) "2230"
Delete in the table under Volume (ml) (Col. 2) "10.0gr/l"
Insert in the table under Fraction (Col. 1) "2"
Insert in the table under Volume (ml) (Col. 1) "230"
Insert in the table under Copper Metal (Col. 3) "10.0gr/l"

Signed and Sealed this

Sixth Day of April 1982

|SEAL|

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,303,704

DATED : December 1, 1981

INVENTOR(S) : Constantine I. Courduvelis et al.

It is certified that error appears in the above-identified patent and that said Letters Patent is hereby corrected as shown below:

On The Title Page Insert:

-- (73) Assignee: Enthone, Incorporated

West Haven, Conn. --.

Signed and Sealed this

Fourth Day of January 1983

[SEAL]

Attest:

GERALD J. MOSSINGHOFF

Attesting Officer    Commissioner of Patents and Trademarks